(12) United States Patent  (10) Patent No.: US 7,848,609 B2
Meitzler  (45) Date of Patent: Dec. 7, 2010

(54) DETACHABLE FIBER HOLDER PLATFORM AND ASSEMBLY

(75) Inventor: Jared Meitzler, Spring Hill, TN (US)

(73) Assignee: 3SAE Technologies, Inc., Franklin, TN (US)

( * ) Notice: Subject to any disclaimer, the term of this patent is extended or adjusted under 35 U.S.C. 154(b) by 0 days.

(21) Appl. No.: 12/331,203

(22) Filed: Dec. 9, 2008

(65) Prior Publication Data

US 2009/0148121 A1   Jun. 11, 2009

Related U.S. Application Data

(60) Provisional application No. 61/012,603, filed on Dec. 10, 2007.

(51) Int. Cl.
*G02B 6/00* (2006.01)

(52) U.S. Cl. ..................... 385/137; 385/147

(58) Field of Classification Search ........... 385/53, 385/74, 88, 97, 134–140, 147
See application file for complete search history.

(56) References Cited

U.S. PATENT DOCUMENTS

| | | | | |
|---|---|---|---|---|
| 5,155,787 A | * | 10/1992 | Carpenter et al. | 385/98 |
| 5,414,790 A | * | 5/1995 | Lee et al. | 385/139 |
| 5,533,160 A | * | 7/1996 | Watanabe et al. | 385/96 |
| 6,226,434 B1 | * | 5/2001 | Koshiyama et al. | 385/134 |
| 6,442,317 B1 | * | 8/2002 | Esmaeili et al. | 385/114 |
| 6,668,128 B2 | * | 12/2003 | Hattori et al. | 385/136 |
| 7,258,496 B2 | * | 8/2007 | Saito et al. | 385/98 |
| 7,280,733 B2 | * | 10/2007 | Larson et al. | 385/139 |
| 7,369,738 B2 | * | 5/2008 | Larson et al. | 385/134 |
| 7,502,542 B2 | * | 3/2009 | Fujisawa et al. | 385/134 |
| 2002/0064355 A1 | * | 5/2002 | Ware et al. | 385/95 |
| 2006/0280417 A1 | | 12/2006 | Sato et al. | |
| 2007/0104445 A1 | * | 5/2007 | Larson et al. | 385/134 |
| 2008/0000134 A1 | * | 1/2008 | Peterson | 42/124 |

FOREIGN PATENT DOCUMENTS

| | | |
|---|---|---|
| JP | 11231164 | 8/1999 |
| JP | 2000292639 | 10/2000 |
| JP | 2007298705 | 11/2007 |

OTHER PUBLICATIONS

International Search Report issued on May 29, 2009 in corresponding PCT Application No. PCT/US2008/086202.

* cited by examiner

*Primary Examiner*—Akm E Ullah
(74) *Attorney, Agent, or Firm*—Mills & Onello, LLP; David M. Mello

(57) ABSTRACT

A fiber holder platform includes a support, a clamp configured to secure a cable to the support, and a securing mechanism configured to detachably secure the platform to a fiber holder and alternatively to a heat oven. A fiber holder assembly includes the fiber holder platform and the fiber holder, in a detachable or integral configuration.

20 Claims, 5 Drawing Sheets

120
DETACHABLE FIBER HOLDER PLATFORM AND ASSEMBLY

CROSS REFERENCE TO RELATED APPLICATIONS

This application claims priority under 35 U.S.C. §119(e) from, commonly owned U.S. provisional patent application Ser. No. 61/012,603 filed Dec. 10, 2007, entitled METHOD FOR SPLICING USING A DETACHABLE FIBER HOLDER PLATFORM, which is hereby incorporated by reference.

FIELD OF INTEREST

The present inventive concepts relate to the field of fiber optics, and more particularly to the field of fiber optic splicers and methods of accomplishing same.

BACKGROUND

In the broadcasting and television industry, most video cameras are capable of capturing high definition (HD) video and relaying the signal back to a central editing/broadcast center or booth. At a large sporting event, these cameras are located at various distances from the editing booth. In order to transmit the signal back to the booth, each camera uses a hybrid HD cable composed of optical fibers and electrical wires.

In some instances, it would be advantageous to be able to splice a cable to a connector in the field, e.g., at a sporting event. One type of splicer that can be used for such purposes is the Fitel® S122 Series fusion placer by Furukawa Electric Co. Ltd. The fusion splicer requires a fiber holder to hold the fiber straight during the splicing process.

FIG. 1 shows a typical fiber holder 10. Fiber holder 10 has a main body with a groove or channel 12 formed therein, within which the fiber can be positioned for splicing, as an example. The fiber is held in place by a lid 14.

The fiber holder 10 is placed in a splicer that includes an "oven" for performing the splice process. In typical splicers, the splicer does not secure the cable during splicing, only the optical fiber. That is, there is a presumption that the cable will be otherwise stably maintained during the splicing process and during the fiber protection process. In the field, maintaining the cable steady during the splicing process can be quite challenging, and instability can severely impact the final splice and, therefore, performance with the hybrid HD cable.

SUMMARY OF INVENTION

In accordance with one aspect of the present invention, provided is a fiber holder platform that includes a support, a clamp configured to secure a cable to the support, and a securing mechanism configured to detachably secure the platform to a fiber holder.

The securing mechanism can also be configured to detachably secure to a heat oven.

The securing mechanism can include at least one magnet.

The cable can be a high definition cable.

The fiber holder can be configured to couple to a splicer.

The fiber holder can be configured to secure at least one optical fiber from the cable.

In accordance with another aspect of the present invention, provided is a fiber holder assembly. The assembly includes a support, a clamp configured to secure a cable to the support, and a fiber holder coupled to the support and configured to secure at least one optical fiber from the cable.

The fiber holder can be detachably coupled to the support with a detachable securing mechanism.

The detachable securing mechanism can include at least one magnet.

The fiber holder platform can be configured to directly and detachably couple to a heat oven.

The fiber holder can be integral with the support to form a rigid unit.

The fiber holder can also be configured to directly and detachably couple to a heat oven.

The cable can be a high definition cable.

The fiber holder can include a channel configured to receive the at least one optical fiber and a lid configured to secure the at least one optical fiber in the channel.

In accordance with another aspect of the present invention, provided is a fiber holder having a main body with a channel formed therein that is configured to receive at least one optical fiber. The fiber holder also includes a lid to secure the at least one optical fiber in the channel. And a securing mechanism is configured to detachably engage a fiber holder platform that is configured to hold a cable comprising the at least one optical fiber.

The fiber holder platform can include an elongated support and a clamp configured to secure the cable.

The fiber holder can be configured to couple to a splicer.

The fiber holder can be configured to couple to a heat oven.

In accordance with another aspect of the present invention, provided is a method of preparing at least one optical fiber of a cable. The method includes securing the cable in a fiber holder platform and coupling a fiber holder to the fiber holder platform and securing the at least one fiber in the fiber holder. The at least one fiber is spliced to at least one other fiber. The fiber holder platform is coupled to a heat oven and a sleeve is shrunk over the splice, wherein the sleeve is positioned over a heating element of the heat oven when the fiber holder platform is coupled to the heat oven.

The method can further include, prior to coupling the fiber holder platform to the heat oven, detaching the fiber holder from the fiber holder platform, and then directly coupling the fiber holder platform to the heat oven.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 1:
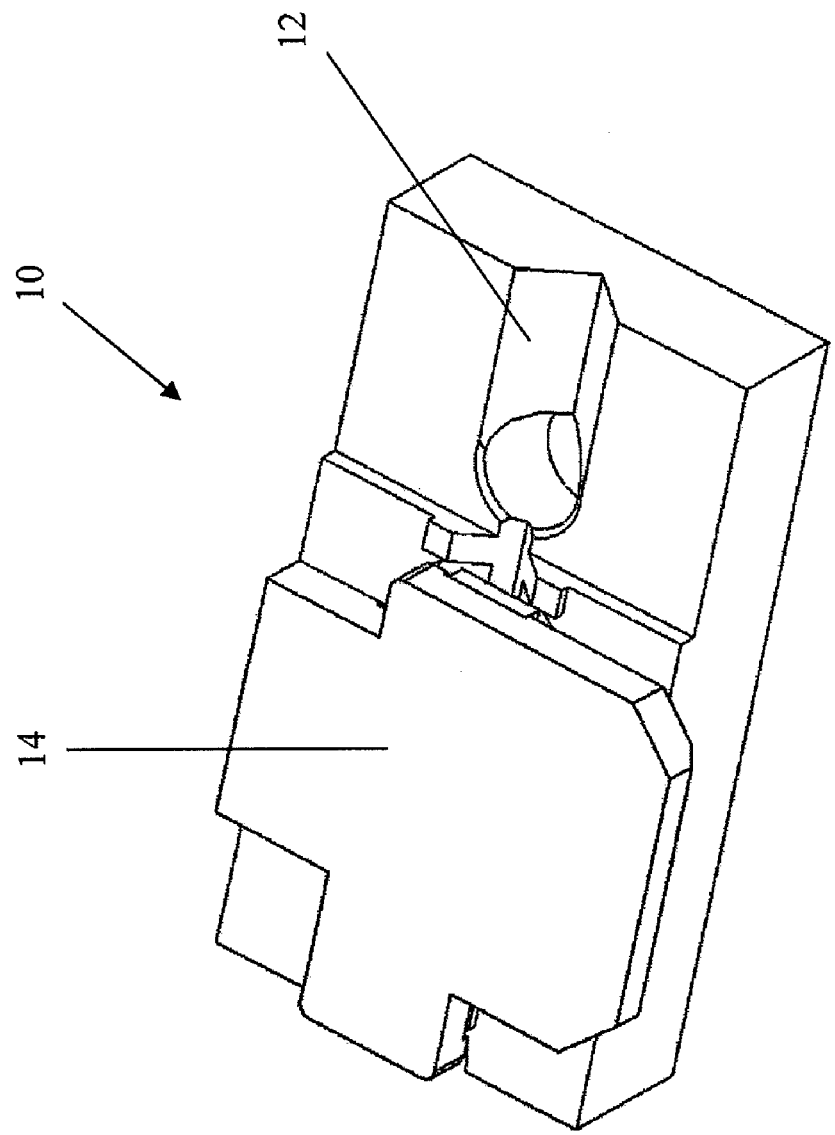
FIG. 1 is a perspective view of a prior art fiber holder.
Figure 2:
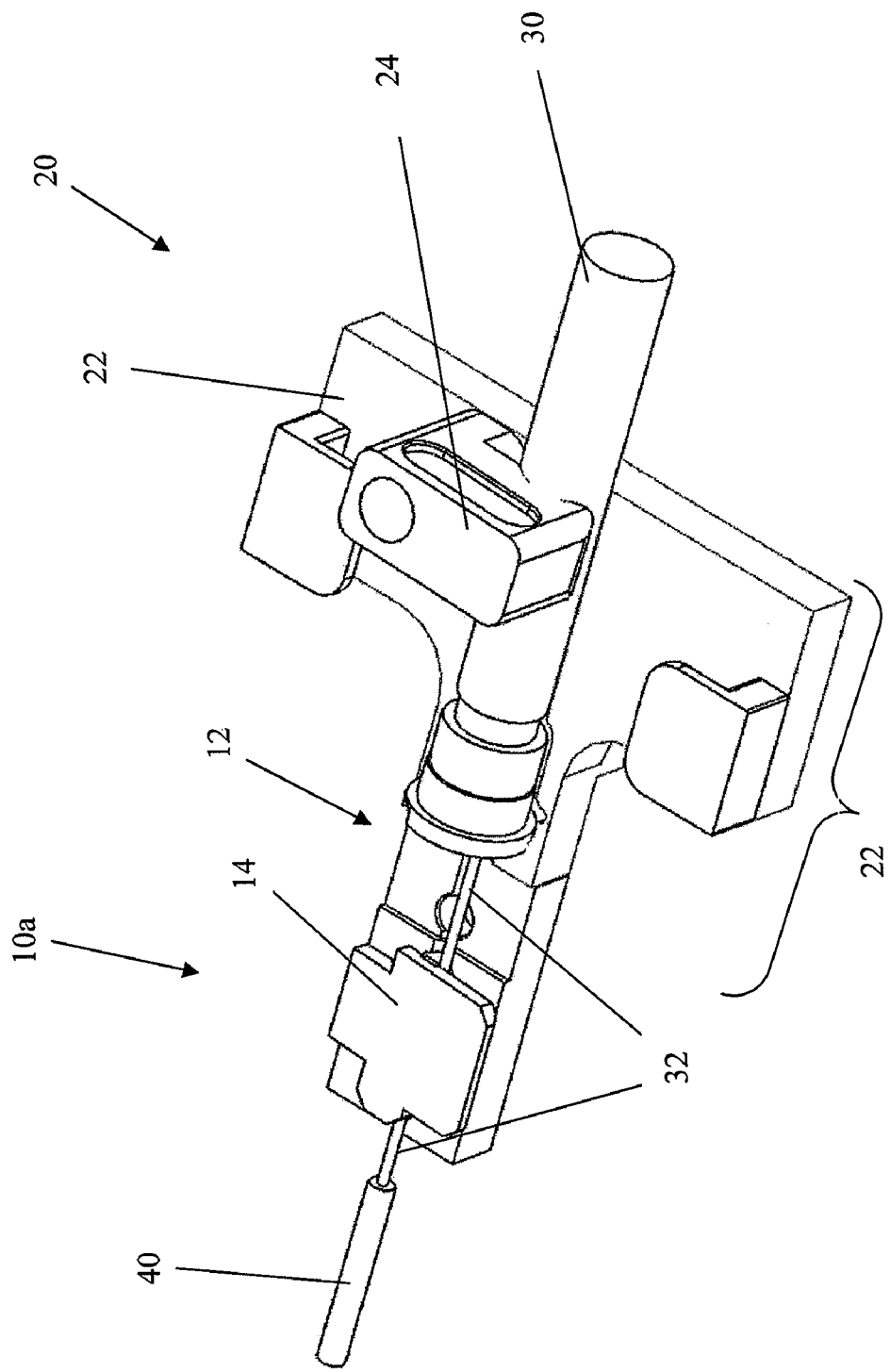
FIG. 2 is a perspective view of an embodiment of a fiber holder assembly in accordance with aspects of the invention.

FIG. 2 is a perspective view of an embodiment of an elongated fiber holder assembly 20 in accordance with aspects of the invention. The elongated fiber holder assembly 20 includes a fiber holder 10a and fiber holder platform 22. Fiber holder 10a is similar to fiber holder 10 of FIG. 1, and also includes a channel 12 formed in a main body and a lid 14. Fiber holder platform 22 includes a cable clamp 24 that is configured to secure a hybrid HD cable 30, for example. In this embodiment, fiber holder 10a is integrally formed with fiber holder platform 22 to form fiber holder assembly 20 as a single rigid unit. In this embodiment, the addition of the fiber holder platform 22 to fiber holder 10a enables cable 30 to be steadily maintained for splicing and/or heat shrinking of a sleeve over the splice.

In FIG. 2, hybrid HD cable 30 is secured to fiber holder assembly 20 via clamp 24, with an optical fiber 32 from cable 30 being held in channel 12 by closed lid 14. Opposite HD cable 30 is an optical fiber (not shown) that is to be spliced with optical fiber 32. A sleeve 40 holds one end of a core optical fiber 32 and an end of the other optical fiber—in an abutting arrangement. Fiber holder assembly 20 can then be placed in a splicer and the optical fibers can be spliced together and the sleeve can be heat shrunk in a heat oven of the splicer to cover the spliced area. In that regard, the sleeve provides protection for the splice.

Figure 3:
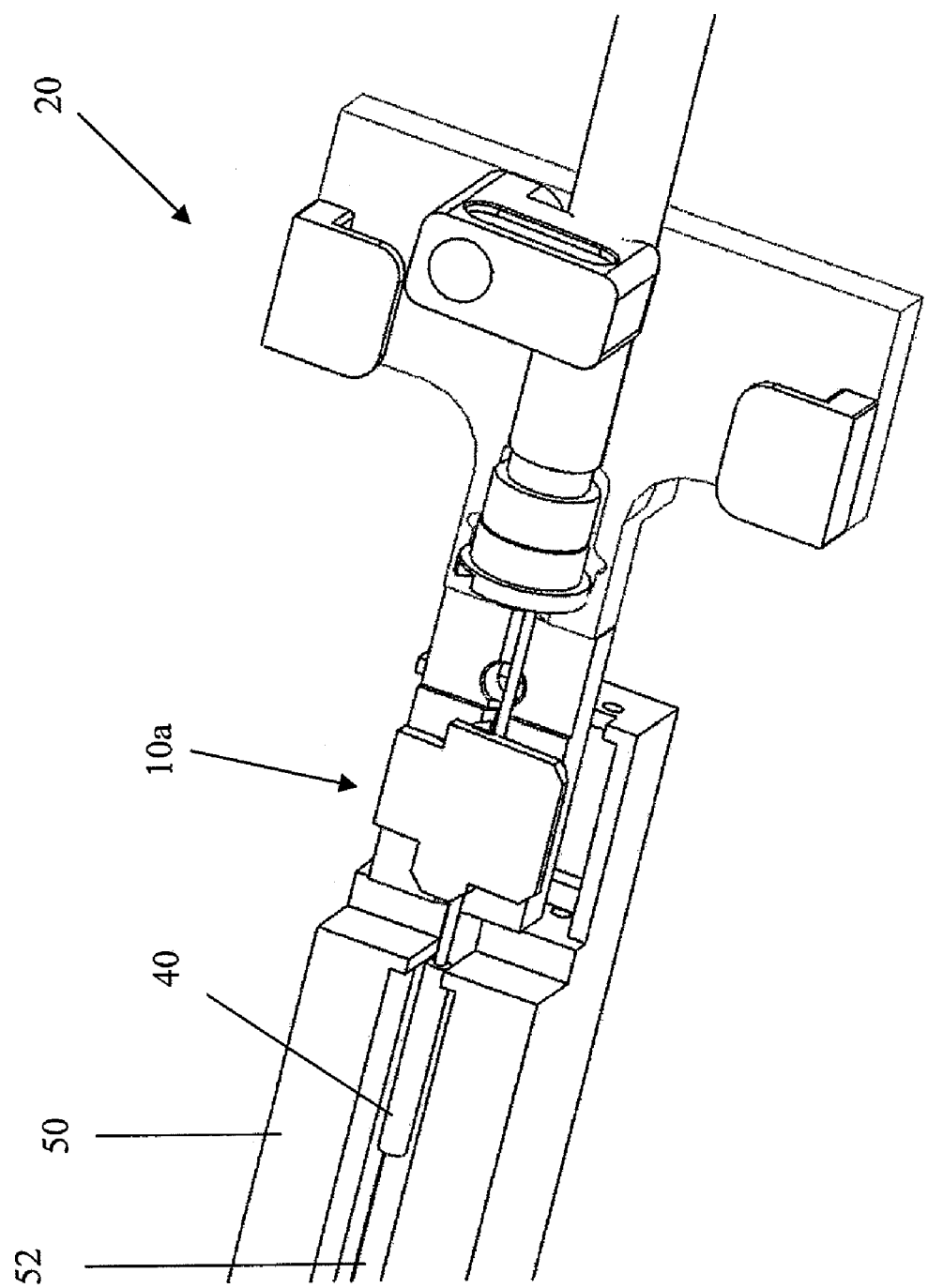
FIG. 3 is a perspective view of the elongated holder of FIG. 2 coupled to a heat oven.

FIG. 3 is a perspective view of the fiber holder assembly 20 of FIG. 2 coupled to or engaged with a heat oven 50 (partially shown). While the fiber holder assembly 20 has significant advantages over the prior art, with some heat ovens there is also room for further improvement. This is demonstrated with heat oven 50 shown in FIG. 3. Generally, heat ovens will heat the protective sleeve 40, which covers the fiber splice, from the center outward so that the sleeve will start shrinking in the middle first, which forces air out of the sleeve during heating to eliminate bubbles. Such heat ovens presume that the sleeve is positioned in the center of the oven, i.e., over a heating element of the heat oven. However, in the design of FIG. 2, as shown in FIG. 3, the sleeve 40 is located to one side of the heat oven 50, rather than at the heat oven center 52. This is because the fiber holder assembly 20 creates an offset of the cable 30 relative to the holder 10a that is not anticipated by heat oven 50. The detachable fiber holder platform of FIGS. 4 and 5 provides an improvement that address this issue for heat ovens like heat oven 50.

Figure 4:
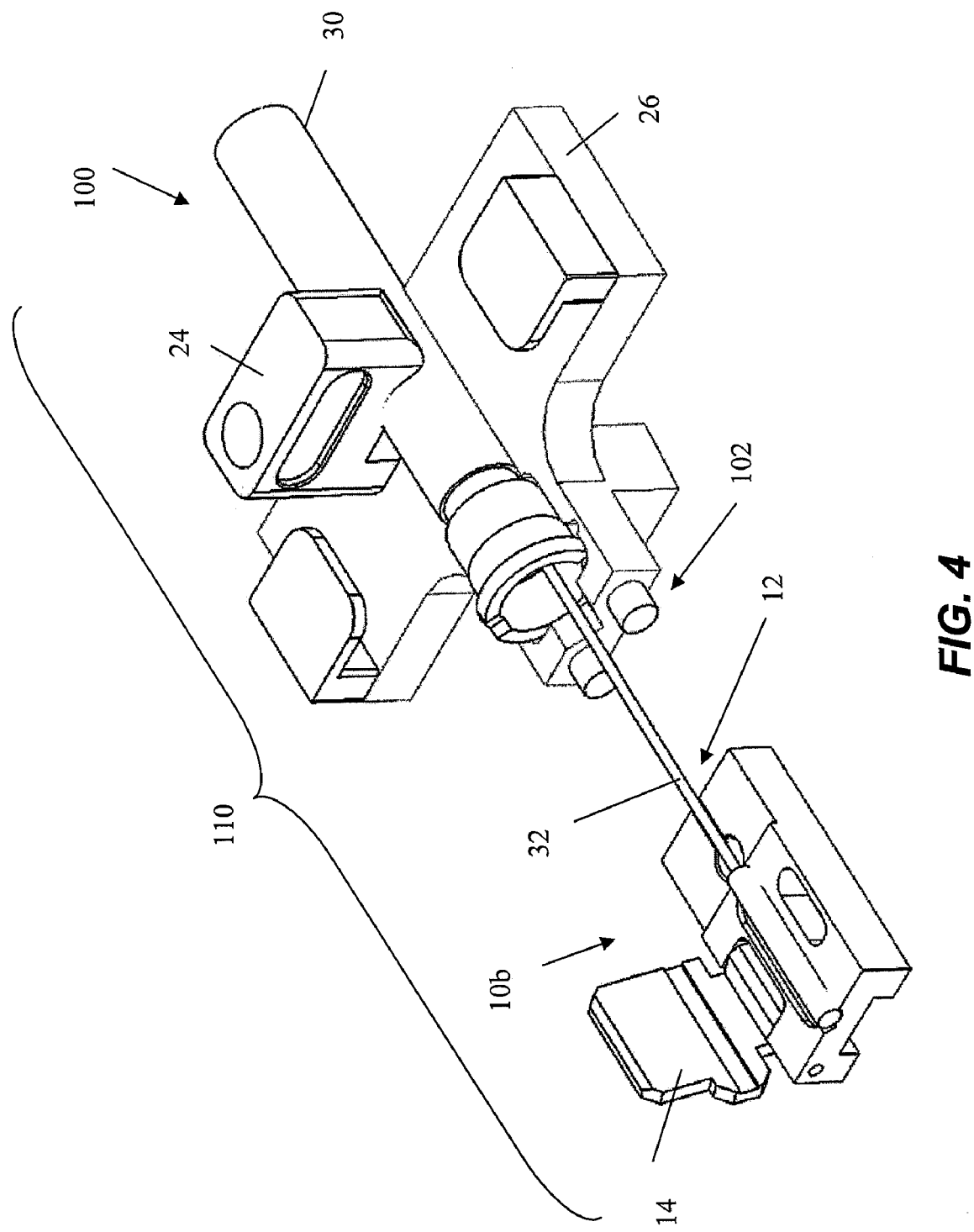
FIG. 4 is a perspective view of an embodiment of a detachable fiber holder platform and assembly in accordance with aspects of the invention.

FIG. 4 provides a perspective view of an embodiment of a fiber holder assembly 110 that includes a detachable fiber holder platform 100, in accordance with aspects of the invention. Detachable fiber holder platform 100 overcomes the problems of the fiber holder assembly 20 of FIGS. 2 and 3. Specifically, detachable fiber holder platform 100 is a platform that can detach from a fiber holder 10b required by the splicer, so that sleeve 40 can be properly heated in heat oven 50.

Detachable fiber holder platform 100 includes a support 26 and a clamp 24 configured to secure the cable 30 to the support 26 and, therefore, the detachable fiber holder platform 100. A securing mechanism, such as magnets 102, are included to enable easy, and removable, securing of the detachable fiber holder platform 100 to the fiber holder 10b, which can be configured to accept engagement with the detachable fiber holder platform 100. As discussed with respect to FIG. 1, holder 10b, like holder 10, includes a channel 12 (or groove) for placement of the fiber 32 and a lid 14 for securing the fiber 32 to the fiber holder 10b within the channel 12. In other embodiments other types of securing mechanisms could be used. For example, in some embodiments the securing mechanism could be a clip, a tongue and groove arrangement, and so on between the detachable fiber holder platform 100 and fiber holder 10b. And the magnets could, for example, be located on the fiber holder 10b rather than on the detachable fiber holder platform 100.

Figure 5:
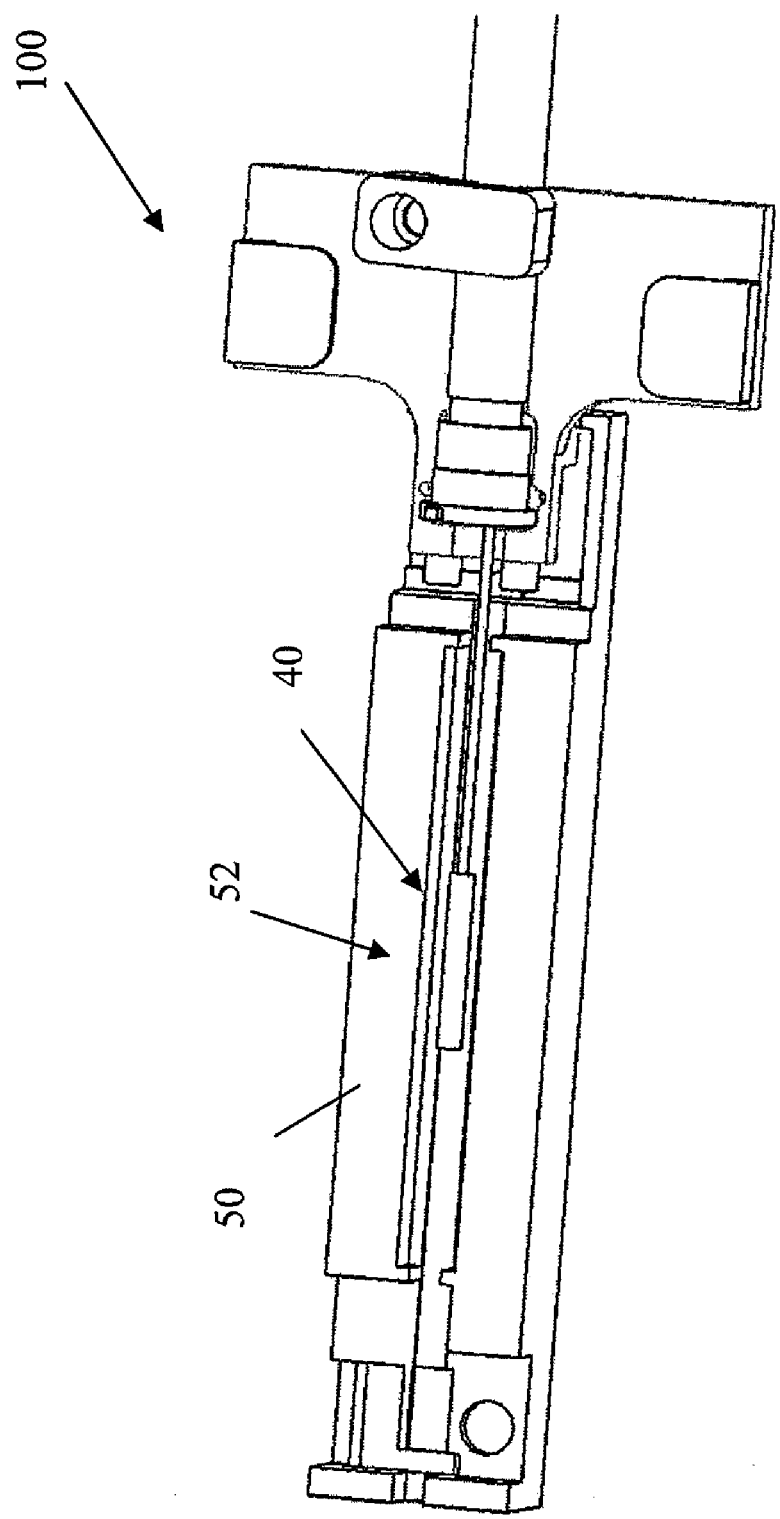
FIG. 5 is a perspective view of the detachable fiber holder platform of FIG. 4 coupled directly to a heat oven.

FIG. 5 is a perspective view of the detachable fiber holder platform 100 of FIG. 4 coupled to heat oven 50. During the splicing process, the fiber holder 10b is held together with the detachable fiber holder platform 100 by magnets 102. However, once the splice is complete in FIG. 5, the fiber holder lid 14 is opened and the entire fiber holder 10b and detachable fiber holder platform 100 can be detached, as shown in FIG. 4. The detachable fiber holder platform 100 can then be engaged with or coupled to the heat oven 50 directly, so that the splice sleeve 40 can be properly centered and shrunk.

FIG. 5 shows the detachable fiber holder platform 100 with the heat oven 50, which causes the heat shrink sleeve 40 to be disposed in the middle of the heat oven 50. As is shown in FIG. 5, because the detachable fiber holder platform 100 is detachable from the fiber holder 10b, the offset of the cable 30 from the heat oven 50 present in the fiber holder assembly 20 embodiment of FIGS. 2 and 3 is eliminated—because the fiber holder 10b is not needed or present between the detachable fiber holder platform 100 and heat oven 50 combination.

In accordance with another aspect of the invention, a method of preparing an optical fiber using a fiber holder assembly is provided. In this embodiment the fiber holder assembly uses the detachable fiber holder platform 100. According to the method, a cable 30 is secured to the fiber holder platform 100 with clamp 24. The fiber holder 10b is attached to the fiber holder platform 100, and the fiber 32 from cable 30 is placed in channel 12 and secured with closed lid 14. An exposed end of fiber 30 is abutted with another fiber and the two fibers are spliced together using a splicer.

Fiber holder 10b and fiber holder platform 100 are detached from each other. The fiber holder platform 100 is then coupled to heat oven, with a sleeve 40 disposed over the splice and at about the center of the heating element of the heat oven 50. The heat oven 50 heats the sleeve from about the center outward to shrink the sleeve over the splice.

The fiber holder platform provides a secure grip of the HD cable 30, which is necessary for both preparing the cable for splicing and splicing itself. Fusion splicers have either a built in clamp or a fiber holder to secure the fiber during splicing. This method of using a platform with a detachable fiber holder is unique, and offers ease of use and compact size. A platform such as that shown in FIGS. 4 and 5 allows the use of a common fusion splicer and a common heat oven.

In another embodiment, rather than the use of a heat oven, the detachable platform could mate to a recoating machine. A recoating machine uses a mould around the spliced fiber. UV curable liquid gets injected into the mould and cured to protect the splice area like a heat shrink sleeve. Those skilled in the art will appreciate that the description above related to the detachable platform could equally apply to such a recoating machine, without need for further explanation of such recoating machines.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A detachable fiber holder platform, comprising:
   a support base that secures a cable having at least one extending optical fiber;
   a clamp that secures the cable to the support base; and
   a securing mechanism that detachably secures the support base to a fiber holder such that the at least one fiber is aligned with a channel of the fiber holder when the fiber holder is attached to the support base.

2. The fiber holder platform of claim 1, wherein the securing mechanism is also configured to detachably secure to a heat oven.

3. The fiber holder platform of claim 1, wherein the securing mechanism includes at least one magnet.

4. The fiber holder platform of claim 1, wherein the cable is a high definition cable.

5. The fiber holder platform of claim 1, wherein the fiber holder is configured to couple to a splicer.

6. The fiber holder platform of claim 1, wherein the fiber holder is configured to secure at least one optical fiber from the cable.

7. A detachable fiber holder assembly comprising:
   a fiber holder platform comprising:
      a support base that secures a cable having at least one extending optical fiber; and
      a clamp that secures the cable to the support base; and
   a fiber holder coupled to the support base that secures the at least one optical fiber extending from the cable within a channel of the fiber holder.

8. The fiber holder assembly of claim 7, wherein the fiber holder is detachably coupled to the support base with a detachable securing mechanism.

9. The fiber holder assembly of claim 8, wherein the detachable securing mechanism includes at least one magnet.

10. The fiber holder assembly of claim 8, wherein the fiber holder platform is configured to directly and detachably couple to a heat oven.

11. The fiber holder assembly of claim 7, wherein the fiber holder is integral with the support base to form a rigid unit.

12. The fiber holder assembly of claim 1, wherein the fiber holder is also configured to directly and detachably couple to a heat oven.

13. The fiber holder assembly of claim 7, wherein the cable is a high definition cable.

14. The fiber holder assembly of claim 7, wherein the fiber holder includes a lid configured to secure the at least one optical fiber in the channel.

15. A fiber holder, comprising:
   a main body having a channel formed therein and configured to receive at least one optical fiber and a lid to secure the at least one optical fiber in the channel; and
   a securing mechanism that detachably engages a fiber holder platform that holds a cable comprising the at least one optical fiber such that the at least one fiber is aligned within the channel of the fiber holder when the fiber holder is attached to the fiber holder platform.

16. The fiber holder of claim 15, wherein the fiber holder platform comprises an elongated support base and a clamp configured to secure the cable.

17. The fiber holder of claim 15, wherein fiber holder is configured to couple to a splicer.

18. The fiber holder of claim 15, wherein the fiber holder is configured to couple to a heat oven.

19. A method of preparing at least one optical fiber of a cable, the method comprising:
   securing the cable with the at least one fiber extending therefrom in a fiber holder platform, the fiber platform including a support base and a clamp that secures the cable to the support base;
   coupling a fiber holder to the fiber holder platform such that the at least one fiber is aligned within a channel of the fiber holder and securing the at least one fiber in the fiber holder;
   splicing the at least one fiber to at least one other fiber; and
   coupling the fiber holder platform to a heat oven and shrinking a sleeve over the splice, wherein the sleeve is positioned over a heating element of the heat oven when the fiber holder platform is coupled to the heat oven.

20. The method of claim 19, further comprising:
   prior to coupling the fiber holder platform to the heat oven, detaching the fiber holder from the fiber holder platform, and then directly coupling the fiber holder platform to the heat oven.

* * * * *